United States Patent [19]

Aiki et al.

[11] Patent Number: 4,876,917
[45] Date of Patent: Oct. 31, 1989

[54] TORQUE VARIATION ABSORBING DEVICE

[75] Inventors: Shigetaka Aiki, Kariya; Kiyonori Kobayashi, Chiryu; Satoshi Kato, Anjo, all of Japan

[73] Assignees: Aisin Seiki Kabushiki Kaisha, Kariya; Toyota Jidosha Kabushiki Kaisha, Toyota, both of Japan

[21] Appl. No.: 227,445

[22] Filed: Jul. 29, 1988

Related U.S. Application Data

[63] Continuation of Ser. No. 25,631, Mar. 13, 1987, abandoned, which is a continuation of Ser. No. 755,899, Jul. 17, 1985, abandoned.

[30] Foreign Application Priority Data

| Jul. 19, 1984 | [JP] | Japan | 59-108288[U] |
| Jul. 19, 1984 | [JP] | Japan | 59-108289[U] |
| Jul. 19, 1984 | [JP] | Japan | 59-108290[U] |

[51] Int. Cl.$^4$ .............. F16D 3/14; F16F 15/10
[52] U.S. Cl. ............... 74/574; 192/106.2; 464/46; 464/68
[58] Field of Search ............ 192/106.2, 30 V; 74/574; 464/10, 46, 66, 68

[56] References Cited

U.S. PATENT DOCUMENTS

| 1,325,057 | 12/1919 | Tibbetts | 74/574 |
| 1,635,855 | 7/1927 | Moorhouse . | |
| 1,982,658 | 12/1934 | Griswold | 75/574 |
| 2,158,244 | 5/1939 | Mistretta et al. . | |
| 2,291,405 | 7/1942 | Nutt . | |
| 2,364,988 | 12/1944 | McFarland . | |
| 2,859,637 | 11/1958 | Hagenlocher | 74/574 |
| 3,107,551 | 10/1963 | Cline | 74/574 |
| 3,136,178 | 6/1964 | O'Connor | 74/574 |
| 3,138,011 | 8/1972 | Stromberg . | |
| 3,983,982 | 10/1976 | Worner | 192/106.2 |
| 4,002,043 | 1/1977 | Yoshida | 74/572 X |
| 4,018,320 | 4/1977 | Schrape et al. | 192/106.2 |
| 4,101,015 | 7/1975 | Radke | 192/106.2 |
| 4,171,147 | 10/1979 | Swisher, Jr. et al. | 74/574 X |
| 4,220,233 | 9/1980 | Ban et al. . | |
| 4,289,220 | 9/1981 | Onuma et al. . | |
| 4,431,100 | 2/1984 | Kajikawa et al. . | |
| 4,433,771 | 2/1984 | Caray . | |
| 4,468,207 | 8/1984 | Yoshida | 74/574 X |
| 4,538,718 | 9/1985 | Maucher . | |
| 4,596,535 | 6/1986 | Ooga . | |
| 4,634,398 | 1/1987 | Alas . | |
| 4,640,402 | 2/1987 | Hartig et al. . | |
| 4,727,767 | 3/1988 | Aiki et al. | 74/574 |

FOREIGN PATENT DOCUMENTS

| 675483 | 12/1963 | Canada . | |
| 1801065 | 5/1959 | Fed. Rep. of Germany . | |
| 1680669 | 7/1970 | Fed. Rep. of Germany . | |
| 2926012 | 2/1980 | Fed. Rep. of Germany . | |
| 3529816 | 3/1986 | Fed. Rep. of Germany . | |
| 644831 | 10/1928 | France . | |
| 258542 | 5/1928 | Italy | 192/105 C |
| 45-27488 | 9/1970 | Japan . | |
| 20930 | 2/1980 | Japan . | |
| 20964 | 2/1980 | Japan . | |
| 43176 | 10/1981 | Japan . | |
| 329414 | 9/1965 | Switzerland . | |
| 320066 | 10/1929 | United Kingdom . | |
| 423948 | 2/1935 | United Kingdom . | |
| 1030851 | 5/1966 | United Kingdom . | |
| 1230284 | 4/1971 | United Kingdom . | |
| 1257458 | 12/1971 | United Kingdom . | |
| 1413429 | 11/1975 | United Kingdom . | |
| 1426885 | 3/1976 | United Kingdom . | |
| 1462014 | 1/1977 | United Kingdom . | |
| 1474566 | 5/1977 | United Kingdom . | |
| 2000257 | 1/1979 | United Kingdom . | |
| 2060819 | 5/1981 | United Kingdom . | |

OTHER PUBLICATIONS

372 Automotive Engineering 93 (1985) Jan., No., Dallas, Tex., U.S.A.

Primary Examiner—Rodney H. Bonck
Attorney, Agent, or Firm—Burns, Doane, Swecker & Mathis

[57] ABSTRACT

The torque variation absorbing device comprises a driving plate, a flywheel, and a spring mechanism, a torque limiting mechanism and a hysteresis mechanism installed between the driving plate and the flywheel. The torque limiting mechanism is located radially inside of the spring mechanism and radially inside of an oil drain hole bored in the flywheel. The side plate at one side of the driving plate is bent toward the flywheel and covers a gap between the driving plate and the flywheel. The side plate at the other side of the driving plate is made of a steel plate and the load supporting points on both sides of the side plate are spaced from each other in the radial direction.

13 Claims, 5 Drawing Sheets

TORQUE VARIATION ABSORBING DEVICE

This application is a continuation, of U.S. application Ser. No. 025,631, filed Mar. 13, 1987, and now abandoned, which is a continuation of Ser. No. 755,899 filed on July 17, 1985, now abandoned.

BACKGROUND OF THE INVENTION

1. Field of the invention

The present invention relates to a torque variation absorbing device for an engine.

2. Description of the prior art

An engine for an automobile or an aircraft is equipped with a torque variation absorbing device for power transmission.

Figure 7:
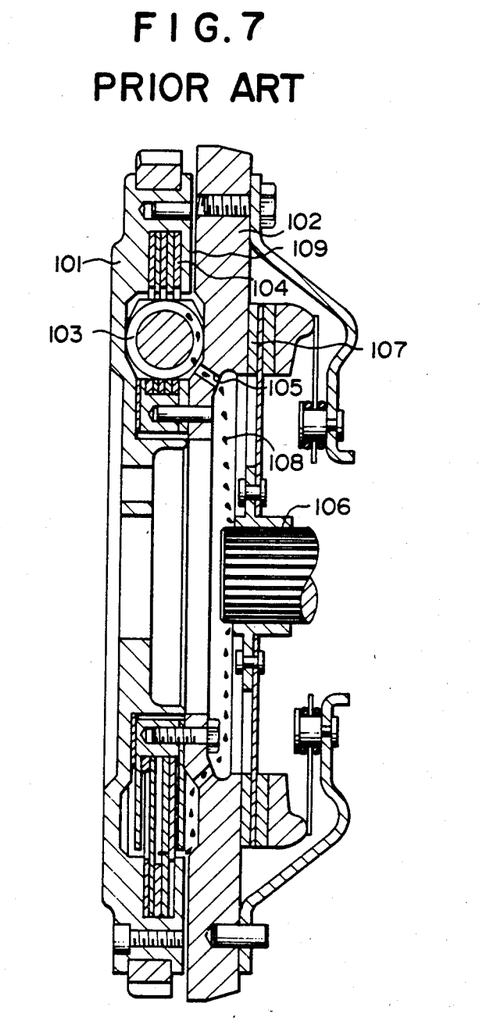
FIG. 7 is a sectional view of a conventional torque variation absorbing device.

The prior art offers such a torque variation absorbing device as disclosed, for instance, in Japanese patent publications SHO 55-020930, SHO 55-20964 and SHO 56-43176. Referring to FIG. 7, a device of the prior art has two inertia members, i.e., a driving plate 101 which is rotatably connected to a crankshaft of an engine and a flywheel 102 which is connected to the follower means and is rotatable with respect to the driving plate. Between the driving plate 101 and the flywheel 102, a spring mechanism 103 and a torque limiting mechanism 104 are installed. In this device the rotation of the crankshaft is transmitted to the flywheel 102 through the driving plate 101, the spring mechanism 103 and the torque limiting mechanism 104. Thus the torque variation is absorbed by the vibration system of these members. An oil drain hole 105 is provided at the inner portion of the flywheel 102. The hole 105 serves to drain the grease or oil 108 splashing from the clutch spline 106 and prevent the oil from reaching a clutch friction surface 107.

However, in the above-mentioned device, the torque limiting mechanism 104 is located radially outside of the spring mechanism 103 and radially outside of the oil drain hole 105. Therefore, oil flowing through the hole 105 can splash on to the torque limiting mechanism 104. The splashed oil may reduce the amount of transmitted torque and cause an undesirable slip. As a result, the vehicle becomes difficult to accelerate and its fuel efficiency drops.

Besides, in the above-mentioned device there is a straight gap 109 extending radially between the driving plate 101 and the flywheel 102. Therefore, the spring mechanism 103 and the torque limiting mechanism 104 are open outwardly. On account of this layout, foreign substance such as a wood chip can invade through the gap as the device is being transported or assembled and cause the performance of the device, and in the worst case, even its durability to deteriorate.

Further, the driving plate 101 of the device is made from a machined casting which is likely to include cavities. Therefore, the plate must be made thick in order to maintain the structural strength of the plate. Consequently, it was difficult to make the device compact.

OBJECTS AND SUMMARY OF THE INVENTION

An object of the present invention is to prevent the oil escaping through the oil drain hole from splashing and reaching the torque limiting mechanism of the torque variation absorbing device.

Another object of the present invention is to prevent foreign substance from invading the device through the peripheral opening of the gap between the driving plate and the flywheel.

Still another object of the present invention is to decrease the thickness of the driving plate in the axial direction by modifying its structure, specifically to accomplish this modification without causing any reduction of strength.

To accomplish above-mentioned objects, the torque variation absorbing device of the present invention provides inertia members comprising a driving plate coupled to the driving shaft and a flywheel coaxially and rotatably supported on the driving plate. Between the driving plate and the flywheel there are interposed a spring mechanism and a torque limiting mechanism. In the device, the slidable part of the torque limiting mechanism is located radially inside of the spring mechanism and is located radially inside of an oil drain hole formed in the flywheel.

Desirably, the driving plate is provided with a cylindrical projection surrounding the flywheel from the outside.

Also desirably, the driving plate is constructed such that a side plate constituting its surface remote from the flywheel is separate from the driving plate body constituting its middle portion. The side plate is desirably fabricated of steel and the load support points on both sides of the side plate in the axial direction are desirably staggered in the radial direction.

In this arrangement of the device, since the slidable part of the torque limiting mechanism is located radially inside of the oil drain hole, the oil escaping through the oil drain hole is centrifugally splashed outwardly from the hole and can escape to the outside through the gap between the driving plate and the flywheel, without hitting the slidable part of the torque limiting mechanism. Therefore, the torque limiting characteristic is stabilized without affecting the frictional slidability of the torque limiting mechanism.

Meanwhile, because the cylindrical projection of the driving plate serves to prevent invasion of foreign substances into the spring mechanism and the torque limiting mechanism of the device, there is significantly less likelihood that the performance characteristics and the durability of the device might deteriorate through obstruction from foreign substances.

Further, because the side plate is constructed from steel and the bearing guide projection is formed in the flywheel body so that no thrust force acts on the side plate, the side plate can be constructed thin and the axial dimension of the device can be reduced. The side plate will receive a bending moment when the device is tilted with respect to the crankshaft and large bending stress may develop in the side plate on account of its thin fabrication. Nevertheless, the stress amplitude will be small and an increased strength of the side plate will be secured, because the load support points on both sides of the side plate are staggered in the radial direction.

BRIEF DESCRIPTION OF THE DRAWINGS

These and other objects and advantages of the present invention will become more apparent and more readily appreciated from the following detailed description of the preferred exemplary embodiments of the invention taken in conjunction with the accompanying drawings, wherein.

DETAILED DESCRIPTION OF THE PREFERRED EMBODIMENTS

A torque variation absorbing device constructed in accordance with a preferred embodiment of the present invention will be described with reference to the drawings.

Figure 1:
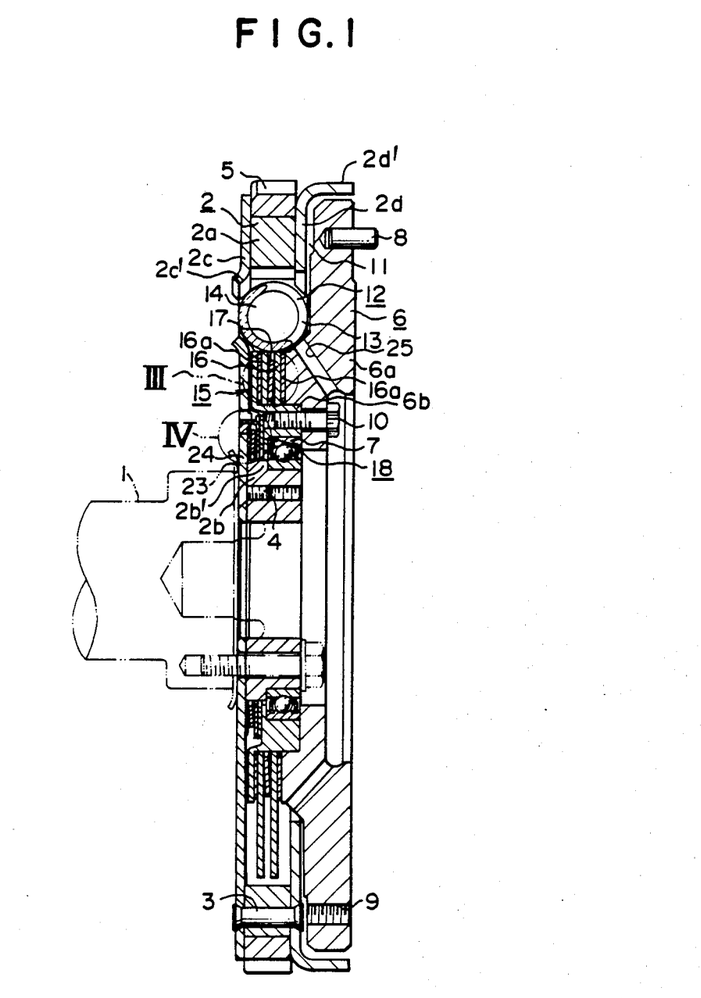
FIG. 1 is a sectional view taken along I—I in FIG. 2 of a torque variation absorbing device constructed in accordance with a preferred embodiment of the present invention.
Figure 2:
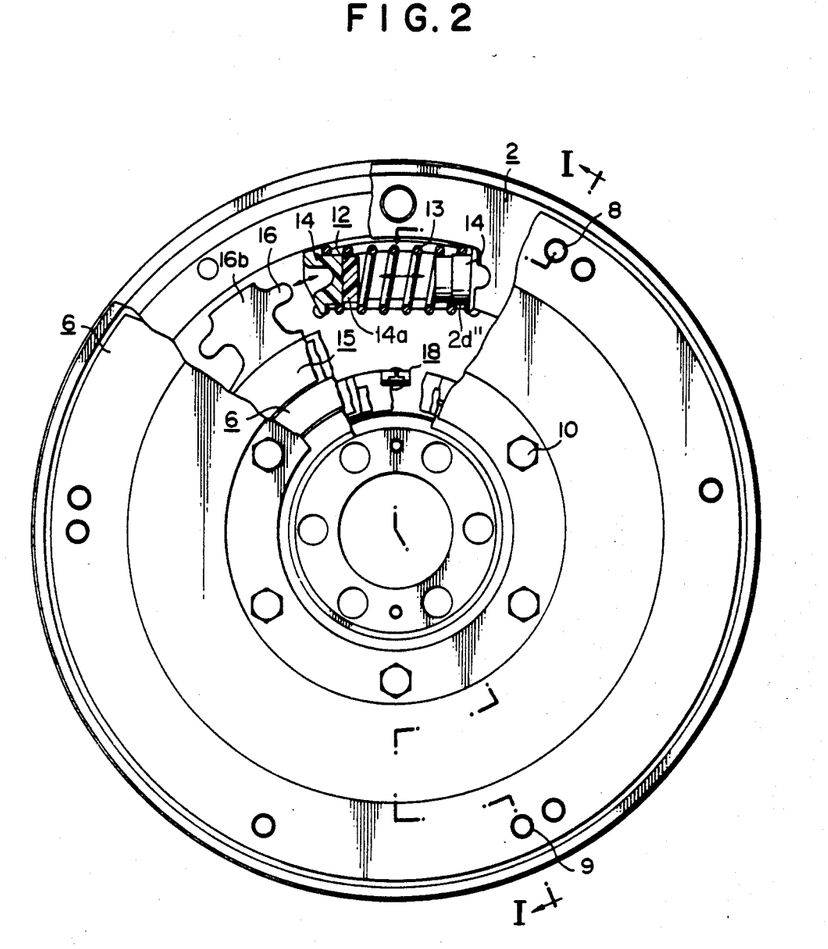
FIG. 2 is a partially sectional, elevation view showing an internal construction of the device of FIG. 1.
Figure 4:
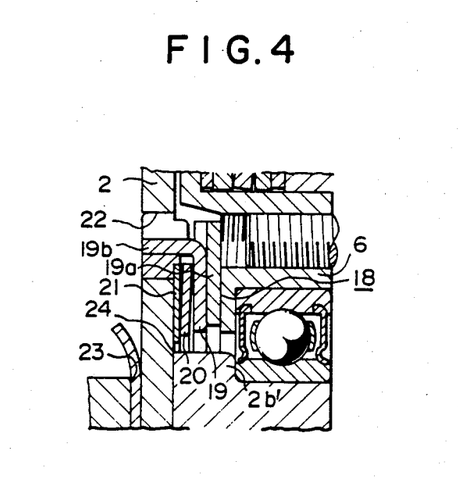
FIG. 4 is a partial sectional view showing the part IV of a hysteresis mechanism of the device of FIG. 1.

In FIGS. 1 and 4, a driving plate 2 is connected to a driving shaft of an engine crankshaft 1, and the driving plate 2 and the driving shaft 1 rotate together. The driving plate 2 comprises an outer body 2a shaped like a ring, an inner body 2b shaped like a ring, and steel side plates 2c and 2d which clamp the outer body 2a from both sides by a rivet 3 and the inner body 2b is connected to the side plate 2c by a screw 4. On the periphery of the body 2a is press-fitted or shrink-fitted a ring gear 5 for accommodating the starting of an engine. On the periphery of the body 2b, a projection 2b' is formed jutting outwardly in the radial direction on the side of side plate 2c which faces a crankshaft 1. Thus the periphery of the body 2b and the projection 2b' together constitute a bearing guide for fitting a bearing 7. The projection 2b' receives a thrust forces from the bearing 7 and thereby prevents the thrust force from acting on the side plate 2c. Steel fabrication of the side plate 2c and the reception of the thrust force by the projection 2b' allow the side plate 2c to be constructed thin. The side plate 2c has an opening, the rim 2c' of which is bent outwardly in the axial direction at a position where a spring mechanism 12 (vibration damping mechanism by a spring) discussed later is housed, and this opening can be easily press-formed. Thus, the side plate 2c of the driving plate 2 is squeezed between the crankshaft 1 and the inner body 2b which functions as a bearing guide. The external end corner 23 of the crankshaft 1 and the outer end corner 24 of the inner body 2b are the load supporting points for the side plate 2c when the torque variation absorbing device tilts with respect to the axis of the crankshaft. The load supporting points 23, 24 are radially staggered and the corner 24 of the body 2b is located further radially outside than the corner 23 of the crankshaft 1.

The side plate 2d which constitutes one part of the driving plate 2 and which is located close to the flywheel 6 has its periphery bent in the L-letter fashion to surround the flywheel 6. The bent portion 2d' covers a gap 11 extending straight in the radial direction between the driving plate 2 and the flywheel 6.

Parallel to the driving plate 2 and coaxial with the driving plate 2, the flywheel 6 is installed rotatably with respect to the driving plate 2 and it is supported rotatably by the driving plate 2 by means of the bearing 7. A clutch-positioning pin 8 is provided for positioning a clutch not shown and a screw hole 9 is formed for fitting the clutch cover (not shown). The flywheel 6 is divided into a flywheel body 6a and a driven plate 6b so that it can house a torque limiting mechanism 15 which will be described later. The flywheel body 6a and the driven plate 6b are connected together by means of a bolt 10. The flywheel body 6a has a plurality of oil drain holes 25 extending therethough toward the spring mechanism 12 which will be described later. The oil drain holes 25 serve to prevent an oil or grease splashing from a clutch spline, etc. (not shown) from reaching the clutch surface of the flywheel 6.

Figure 5:
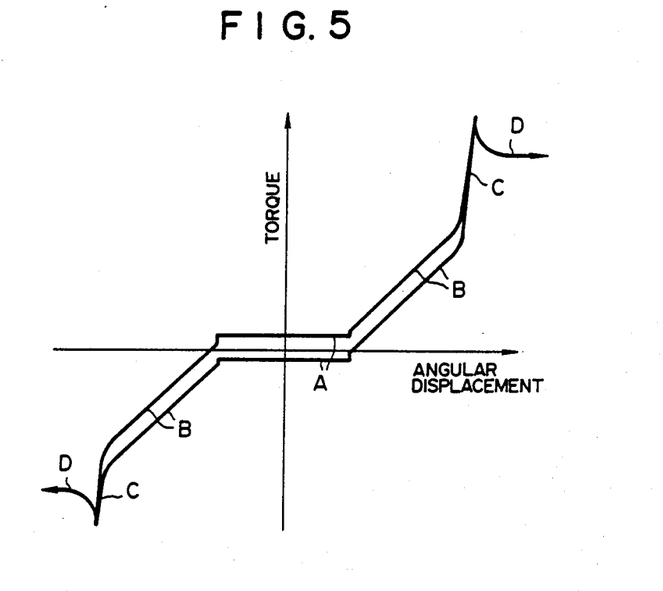
FIG. 5 is a diagram showing a torque transmission characteristic of the device of FIG. 1.

A spring mechanism 12 is provided between the driving plate 2 and the flywheel 6. The spring mechanism 12 is composed of a coil spring 13 which extends circumferentially and spring seats 14 provided at both ends of the coil spring 13. The spring seats have portions which 14 are deformable with a greater spring constant than the spring 13. The spring seats 14 provided at both ends of the coil spring 13 are identical in shape, but one spring seat 14 is able to contact one circumferential end of the rim 2c' of the opening formed in the plate 2c and one circumferential end of a rim 2d''' of a slot formed in the side plate 2d, while the other spring seat 14 is able to contact a radial extension 16b of a driven disk 16 of the torque limiting mechanism 15 which will be described later. When no torque is acting, there is a gap between the least one of the spring seats 14 and at least one of the members 2c and 2d 16b which the seat 14 is able to contact, thereby producing a torque-free characteristic A of FIG. 5. The characteristic A, however, has hysteresis on account of a hysteresis mechanism 18 which will be described later. The characteristic B in FIG. 5 is produced on account of a deformation of the spring 13 and the characteristic C is produced on account of a deformation of the deformable portions 13a of the spring seat 14 when the spring 13 is compressed to make the two spring seats 14 contact each other.

Figure 3:
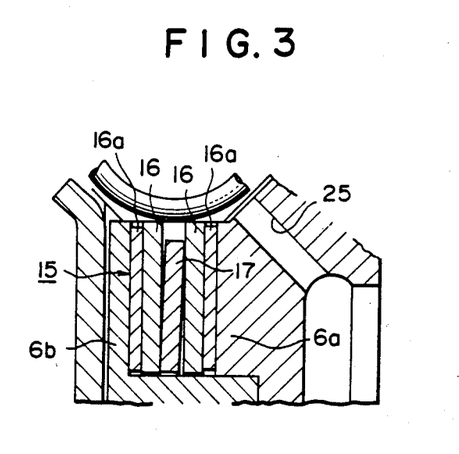
FIG. 3 is a partial sectional view showing the part III of the device of FIG. 1.

As seen from FIG. 1, the torque limiting mechanism 15 is located radially inside of the spring mechanism 12. The slidable part of the torque limiting mechanism 15 is located radially inside of the open end, on the side of the spring mechanism 12, of the oil drain hole 25 in the flywheel 6. As shown in FIG. 3, the torque limiting mechanism 15, which is carried by the flywheel 6, comprises a pair of driven disks 16, 16 and a cone spring 17 installed between these disks 16, 16 and pressing the disks 16, 16 against the flywheel body 6a and the driven plate 6b. On the surfaces of the sides of the driven disks 16, 16 which contact the flywheel body 6a and the driven plate 6b are provided linings 16a, 16a of abrasive material. Vibrations due to torque variations can be damped by a sliding friction loss between the linings 16a and the flywheel body 6a and the driven plate 6b at a region D of FIG. 5, but a main function of the torque limiting mechanism 15 is to cut an excessively large torque variance transmission from the driving plate 2 to the flywheel 6. The thrust force of the driven disk 16 against the flywheel body 6a and the driven plate 6b depends upon the cone spring 17. When the torque is less than the frictional force which depends on this thrust force, the driven disk 16 and the flywheel 6 rotate together. When the torque exceeds the frictional force, relative slip takes place between the driven disk 16 and the flywheel 6, thereby releasing the portion of torque in excess of the frictional force. The characteristic D in FIG. 5 indicates the state that the torque in excess of the frictional force is released during such transmission.

The hysteresis mechanism 18 is located further radially inside of the torque limiting mechanism 15 and between the driving plate 2 and the flywheel 6. FIG. 4 illustrates the hysteresis mechanism 18. As seen from FIG. 4, in the hysteresis mechanism 18, a hysteresis plate 19 provided with a lining 19a of abrasive material is partially bent and a bent portion 19b is fitted into a hole 22 bored in the side plate 2c of the driving plate 2, thereby fixing circumferentially the hysteresis plate 19 to the driving plate 2. A cone spring 20 is installed between the hysteresis plate 19 and a plate 21 provided on the side of side plate 2c, thereby pressing the lining 19a of the hysteresis plate 19 against the flywheel 6. The sliding friction between the lining 19a and the flywheel 6 produces a hysteresis as illustrated in FIG. 5.

Figure 6:
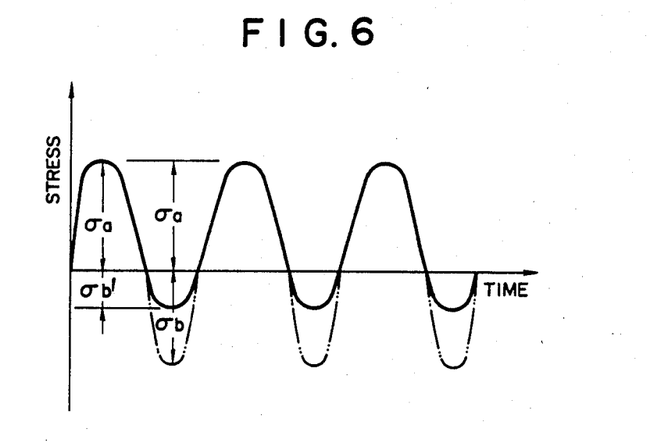
FIG. 6 is a diagram showing the variation of stress developed in the side plate of the device of FIG. 1.

Next, the action of the above-mentioned device of the present invention will be described referring to FIGS. 5 and 6. The rotational torque of the engine crankshaft 1 is transmitted to the driving plate 2 which rotates together with the crankshaft 1, and then to the flywheel 6 via the spring mechanism 12, the torque limiting mechanism 15 and the hysteresis mechanism 18. Thereby a small variation of the torque of the crankshaft 1 and the engine vibration can be absorbed by a vibration system which comprises the spring mechanism 12, the torque limiting mechanism 15, the hystersis mechanism 18 and the inertia members, i.e., the driving plate 2 and the flywheel 6.

As illustrated in the characteristics A, B, C, and D of FIG. 5, for the purpose of effectively absorbing the vibrations in an idling state of an engine, a soft spring characteristic is required when the relative rotational displacement between the driving plate 2 and the flywheel 6 is small and a hard spring characteristic is required for the purpose of making the spring mechanism 13 compact when the relative rotational displacement is large. Further, when a torque larger than required acts, it is necessary for the purpose of protecting the power train to limit the torque and transmit it to the clutch.

For these purposes, when the torque is small, the gap between the spring seat 14 and the driven disk 16 and the low frictional force of the hysteresis mechanism 18 effectively act to produce the characteristic A. Next, when the spring seat 14 and the driven disk 16 comes into contact, the spring 14 deforms under an increased torque, producing the characteristic B. When with a further increase of the torque the spring 13 deforms more largely to cause two spring seats 14 to contact each other, the deformable portions 13a of spring seats 14 themselves deform under the increased torque, producing the characteristic C. When the torque increases and exceeds a specified torque, a slip develops between the torque limiting mechanism 15 and the flywheel 6, thereby releasing an excess of the torque and producing the characteristic D. In this way, the torque can be transmitted to the power train with its variations effectively absorbed.

To produce these characteristics consistently, no invasion of oil or grease splashing from the clutch spline mechanism into the sliding friction parts of the device, particularly into the torque limiting mechanism 15 or the hysteresis mechanism 18 can be tolerated, because a splashing of the friction surface of, say, the torque limiting mechanism 15 with oil or grease will result in a reduction of the frictional coefficient, a change of the characteristics of FIG. 5 and an eventually development of a slip.

In the prior device with the oil drain hole 105 located at a position illustrated in FIG. 7, the oil or grease flowing through the hole 105 was likely to invade the torque limiting mechanism, while in the device of the present invention illustrated in FIGS. 1 to 4, with the torque limiting mechanism 15 and the hysteresis mechanism 18 located inside of the hole 25, the oil which passes through the hole 25 and flows toward the spring mechanism 12 can go to the outside through the gap 11 between the driving plate 2 and the flywheel 6 without touching the torque limiting mechanism 15 and the hysteresis mechanism 18. Thus the slidable parts of the torque limiting mechanism 15 and the hysteresis mechanism 18 are protected from the invasion of oil or grease, and accordingly the characteristics of FIG. 5 will not be affected.

Also, to maintain the stability of these characteristics, no invasion of foreign substances into the torque variation absorbing device, particularly into the spring mechanism 12 or the torque limiting mechanism 15 is tolerated, because an invasion of foreign substance into the friction surface of the torque limiting mechanism 15, for example, will change the frictional coefficient and affect the characteristics of FIG. 5. In the conventional device of FIG. 7, in which the spring mechanism 12 and the torque limiting mechanism 15 are open outwardly through the gap extending outwardly in the radial direction between the driving plate and the flywheel, foreign substances can invade through the gap. In the device of the present invention shown in FIGS. 1 to 4, the gap 11 between the driving plate 2 and the flywheel 6 is covered with a cylindrical projection 2d' formed at the periphery of the side plate 2d of the driving plate 2, thereby preventing foreign substances from invading through the gap 11. Thus, the characteristics of FIG. 5 are stabilized and durability is enhanced.

For the purpose of providing such a torque variation absorbing device in a limited space of an automobile and maintaining sufficient strength and durability of the device, the side plate 2c of the driving plate 2 is designed as a separate member from the bodies 2a, 2b and is fabricated of steel. The steel plate is more reliable in strength than the casting and therefore can be constructed thinner. This thinner designing makes it possible to reduce the axial dimension of the driving plate 2 as compared with the case of a plate machined from a casting.

The periphery 2c' of the opening of the side plate 2c where the spring mechanism 12 is housed is bent outwardly in the axial direction by press-working or the like and the spring 13 can be housed even though the thickness of the driving plate 2 is reduced. Thus, the driving plate 2 can be successfully reduced in thickness. The bending of the periphery 2c' is possible, because the side plate 2c is fabricated of steel. Because the side plate 2c is made thin through use of steel, the load is supported at the points 23, 24 and the variable load of bending moment is imposed on the side plate 2c when the torque variation absorbing device is tilted with respect to the crankshaft 1. If the load supporting points 23 and 24 are radially aligned, the amplitude of the variable stress developed in the side plate 2c will be, as indicated by a two-dot chain line in FIG. 6, the sum of the bending stresses $\sigma a$ and $\sigma b$ developed at the load supporting points 23 and 24. In the case of the device according to the present invention, in which the load supporting points 23 and 24 are staggered or spaced from each other in the radial direction, the amplitude of the variable stress developed in the side plate 2c, as indicated in FIG. 6, will be the sum of the bending stress $\sigma_a$ developed at one supporting point and the bending stress $\sigma_b'$ developed at said one point due to the bending stress $\sigma_b$ at the other load supporting point. Since $\sigma_b'$ is smaller than $\sigma_b$, the amplitude of the variable stress ($\sigma_a + \sigma_b'$) will be small. As a result, with the strength against the variable and repeated load increased, the structural reliability will be enhanced.

As evident from the above description, the present invention in which the torque limiting mechanism 15 is located radially inside of the spring mechanism 12 and radially inside of the opening of the oil drain hole 25 in the flywheel 6 brings about such a benefit that the torque limiting mechanism 15 can exhibit stable performance without being affected by oil or grease coming through the oil drain hole 25 into the spring mechanism 12 and with no possibility of the torque decreasing or the slidable part inadvertently slipping.

Location of the torque limiting mechanism 15 inside of the spring mechanism 12 is also effective in reducing the amount of slip for the same relative rotational angle. In addition, the small outer diameter of the cone spring 17 for pushing the lining 16a contributes to a reduction in costs and since the slidable parts are opened outwardly, the elimination of abraded dust from the lining 16a will be facilitated.

Further, according to the present invention in which the driving plate 2 is provided with a cylindrical projection 2d' which surrounds the flywheel 6, invasion of foreign substances through the gap 11 between the driving plate 2 and the flywheel 6 into the spring mechanism 12 or the torque limiting mechanism 15 can be prevented with the result that deterioration of the torque transmission characteristics due to foreign substances can be avoided and the durability of the device is enhanced.

Furthermore, according to the present invention in which the side plate 2c of the driving plate 2 is separately fabricated from the outer and inner bodies 2a and 2b, the side plate 2c is made of steel and the load supporting points 23 and 24 on both sides of the side plate 2c are radially staggered. Consequently, such additional benefits are obtained such as a reduction of the axial dimension of the device and full strength of the side plate 2c in spite of its reduced thickness.

Although only several preferred embodiments of the present invention have been described in detail, it will be appreciated by those skilled in the art that various modifications and alterations can be made of the preferred embodiments shown without materially departing from the novel teachings and advantages of this invention. Accordingly, it is to be understood that all such modifications and alterations are included within the scope of the invention as defined by the following claims.

What we claim is:

1. A torque variation absorbing device comprising:
    a driving plate coupled to an engine crankshaft;
    a flywheel, which is connectable to a power train, arranged coaxial with said driving plate and rotatably supported via a bearing on said driving plate, said flywheel comprising a flywheel body extending in a radial direction of said flywheel so as to be opposed to said driving plate in an axial direction of said flywheel and to be provided substantially parallel to said driving plate; and
    a spring mechanism, a torque limiting mechanism and a hysteresis mechanism interposed between said driving plate and said flywheel, said spring mechanism extending in a circumferential direction of said driving plate and flywheel, said torque limiting mechanism being adjusted so as to slip only when an excessively large torque acts on said torque limiting mechanism and being located radially inside of said spring mechanism, and said hysteresis mechanism being provided so as to produce a friction force when relative rotation occurs between said driving plate and said flywheel, said spring mechanism and said torque limiting mechanism being arranged in series with each other and between said driving plate and said flywheel as a vibration damping system, said hysteresis mechanism being arranged in parallel to the series arrangement of said spring mechanism and said torque limiting mechanism.

2. The torque variation absorbing device of claim 1, wherein said flywheel includes said flywheel body and a driven plate connected to said flywheel body and said flywheel body and said driven plate together house said torque limiting mechanism.

3. The torque variation absorbing device of claim 1, wherein said spring mechanism comprises said coil spring extending in the circumferential direction of said driving plate and said flywheel, and spring seats provided at both ends of said coil spring and having portions which have a greater spring constant than that of said coil spring.

4. The torque variation absorbing device of claim 3, wherein one of said spring seats is opposed to an opening or a slot formed in said driving plate, while another of said spring seats is opposed to a radially outward projection of a driven disk of said torque limiting mechanism, and in the absence of torque, a gap exists between at least one of said spring seats and the member to which said at least one of said spring seats is opposed.

5. The torque variation absorbing device of claim 2, wherein said torque limiting mechanism comprises a pair of driven disks and a cone spring interposed between said driven disks for pressing said driven disks against said flywheel body and said driven plate.

6. The torque variation absorbing device of claim 5, wherein surfaces of said pair of driven disks which contact said flywheel body and said driven plate are provided with abrasive material.

7. The torque variation absorbing device of claim 1, wherein said hysteresis mechanism includes a hysteresis plate having a lining of abrasive material and a bent portion, the bent portion being fitted into a hole formed in said driving plate, and a cone spring interposed between said hysteresis plate and said driving plate for pressing said lining of said hysteresis plate against said flywheel.

8. The torque variation absorbing device of claim 1, wherein said flywheel is provided with an oil drain hole bore extending toward said spring mechanism and said torque limiting mechanism is located radially inside of an open end, on the side of said spring mechanism, of said oil drain hole bore in said flywheel.

9. The torque variation absorbing device of claim 8, wherein the flywheel body of said flywheel is provided with a plurality of said oil drain hole bores.

10. The torque variation absorbing device of claim 1, wherein said driving plate is provided with a cylindrical projection which surrounds said flywheel and covers a gap between the driving plate and the flywheel.

11. The torque variation absorbing device of claim 10, wherein said driving plate comprises ring-shaped inner and outer bodies and a pair of steel side plates which clamp said outer body from both sides, said cylindrical projection being a bend formed in one of said side plates closer to said flywheel.

12. The torque variation absorbing device of claim 1, wherein said driving plate comprises inner and outer bodies and a pair of steel side plates and a first one of said side plates is located on a crankshaft side of the driving plate, said first side plate having a load supporting point on each surface of said first side plate, which points are spaced from each other in the radial direction of the flywheel.

13. The torque variation absorbing device of claim 12, wherein said two load supporting points are located at end sections of the crankshaft and at an end section of the inner body of said driving plate, respectively, and said section of the inner body of the driving plate is located radially outside of said sections of the crankshaft.

* * * * *